United States Patent [19]
Foerster et al.

[11] Patent Number: 5,699,672
[45] Date of Patent: Dec. 23, 1997

[54] REFRIGERATION METHOD AND APPARATUS

[75] Inventors: Hans Foerster, Beimsstrasse 59, D-39110 Magdeburg; Wolfgang Leser, Jesteburg, both of Germany

[73] Assignee: Hans Foerster, Magdeburg, Germany

[21] Appl. No.: 612,809

[22] Filed: Mar. 11, 1996

[30] Foreign Application Priority Data

Mar. 7, 1995 [DE] Germany .................. 195 07 920.5

[51] Int. Cl.⁶ .................................................. F25B 9/00
[52] U.S. Cl. .................................................. 62/86; 62/402
[58] Field of Search ........................ 62/401, 402, 86, 62/87

[56] References Cited

U.S. PATENT DOCUMENTS 3,394,555  7/1968  La Fleur .......................... 62/402
3,854,300  12/1974  Gerhold .......................... 62/402
4,553,407  11/1985  Rannenberg .................... 62/402

*Primary Examiner*—Ronald C. Capossela
*Attorney, Agent, or Firm*—Karl Hormann

[57] ABSTRACT

The invention relates to a novel refrigeration method and apparatus in which air is used as coolant and primary refrigerant. The air is subjected to substantially isothermal compression in a water-injected screw-type compressor, cooling in first and second scrubber columns operated by separate refrigerant circuits, and subsequent adiabatic substantially isentropic expansion in a high-speed turbine. Heat exchangers may be provided for the removal of residual coldness from the expanded air and for preheating the air fed to the compressor.

20 Claims, 3 Drawing Sheets

REFRIGERATION METHOD AND APPARATUS

BACKGROUND OF THE INVENTION

1. Field of the Invention

The invention, in general, relates to a novel refrigeration method and apparatus and, more particularly, to a refrigeration method and apparatus in which air is used as the coolant as well as the primary refrigerant. The method utilizes substantially isothermal compression and adiabatic isentropic expansion. Preferably, a screw compressor with water injection is utilized for the compression, and a high-speed turbine is utilized for the expansion. Cooling of compressed air below 0° C. is accomplished in a direct cooler. The method may be practiced wherever combustible, poisonous or polluting coolants are unacceptable. The applications considered are for sliding temperatures at about −30° to −160° C. The method in accordance with the invention is ideally suited for applications not only in slaughter houses and cold storage facilities, but in any facilities where liquid nitrogen is at present used as a coolant, such as, for example, in rubber recycling systems.

2. State of the Art

German patent specification DE 4,127,224 discloses a method of the general kind in which air is used as a coolant and refrigerant with isothermal compression of the air. That method has been found to suffer from certain disadvantages, including:

- the way in which residual coldness is recovered by direct heat exchange between air as the primary refrigerant and a liquid secondary refrigerant at low pressure, particularly because of the loading of the pure air with volatile refrigerants where the residual coldness is regeneratively utilized by direct heat exchange which necessitates, or results in, larger compressors, higher consumption of energy and additional steps for the separation of substances, and which does not permit the use of highly volatile secondary refrigerants for very low temperatures;
- the low precooling of the compressed air prior to its expansion where the available coldness by a counter current or backward-feed operation of the substance to be cooled and the cold air is efficiently utilized so that little residual coldness is available for the precooling operation, so that any residual vapor content condenses or sublimates only after the expansion causing a rise in temperature relative to the expansion of pure air downstream of the turbine;
- the rigid coupling between compressor and turbine by a transmission which is subject to wear and limits, or renders difficult, controlling the compressor and turbine separately;
- the balancing of output peaks which compels an oversized system; and
- limiting the method to secondary refrigerants of low volatility and the disadvantage of high pressure conditions as well as low energetic effectiveness at demanding coldness parameters.

The last-mentioned disadvantage applies, for instance, to water-salt-mixtures or to secondary glycol-based refrigerants for instance, which may be used in direct heat exchange methods for utilizing residual coldness. Because of the crystallization hazard such refrigerants are subject to narrow temperature ranges. Hence, at a direct heat exchange low temperatures can be attained only by raising the pressure conditions entailing the mentioned disadvantages as to the consumption of energy.

For low temperatures at moderate pressure conditions organic secondary refrigerants are necessary. But because of their higher volatility they require a differently set up method.

A cold air refrigeration method utilizing water injection screw compressors is taught by (East) German patent specification 31 39 398. Because of the series-connection of adiabatic compressors it does not provide for isothermal compression, and the utilization of surface heat exchangers for the precooling of compressed air leads to the problem of freezing typical of such apparatus and requires convertible apparatus equipped with defrosters.

German laid-open patent specification 43 03 670 A1 discloses, in the context of separating organic vapors from air or technical gases, the utilization of direct heat exchangers for the precooling of gas-vapor mixtures and for condensing the vapors. Compression is provided by commonly known screw compressors equipped with water injection.

Such a method does not, however, provide for releasing coldness. Rather, all of the coldness is used internally for the condensation of vapors contained in the laden gases. Accordingly, the resultant operation cannot be compared to a refrigeration method for use with any coldness consumer having demanding parameters.

OBJECTS OF THE INVENTION

It is accordingly an object of the invention to provide for a refrigeration method utilizing air as coolant and refrigerant.

A more specific object of the invention is to provide a method of the kind referred to which for demanding coldness parameters may also be operated with volatile secondary refrigerants at moderate pressure conditions without enlarging the intake volume of the compressor.

Yet another object of the invention resides in the provision of a refrigeration method avoiding for utilizing the cold air the disadvantages of condensation and sublimation following expansion of the air, large temperature ranges notwithstanding.

Still another object of the invention resides in a refrigeration method which adjusts to rapid output peaks and the start-up and control of which is simple.

BRIEF SUMMARY OF THE INVENTION

In the accomplishment of these and other objects, the invention in a preferred embodiment thereof provides for, following the extraction of useful coldness, the transfer of residual coldness of cold air at low pressure and with an indirect exchange of heat (through a rigid wall) to a refrigerant. Any further maximum precooling of a secondary refrigerant is provided by an extraneous source of coldness, such as for instance, a cold vapor refrigeration device. Such extraneous source of coldness may be dispensed with in cases of substantial residual coldness. A refrigerant storage may be provided to satisfy high coldness demands and to provide short start-up times. For water-insoluble organic secondary refrigerants there may be provided separation by gravity of water drawn into the system, and its return. Where water-insoluble refrigerants are used a partial flow thereof may be diverted to be processed into pure water and an aqueous phase to be returned to the appropriate systems. A rigid connection between compressor and turbine by way of a transmission is not mandatory, and a turbine may be operated independently of a compressor with one energy consumer.

Certain advantages are derived from practicing the method in accordance with the invention. Among these are the possibility of using low boiling point and thus highly volatile substances as secondary refrigerants for demanding coldness parameters, such as, for instance, −160° C., at low pressure conditions and without increasing the volume of the gas flow to be compressed. That is to say, the invention may be practiced without increasing energy consumption. The energy required for the removal of water drawn into the system stays low or insignificant.

Further advantages may be derived from the possibility of adding an extraneous source of coldness for the precooling of refrigerant (lowering the pressure condition), by cold storage of the secondary refrigerant to compensate for output peaks or for an accelerated start-up, as well as by fractionating organic secondary refrigerants and by diverting light components following expansion.

DESCRIPTION OF THE SEVERAL DRAWINGS

The novel features which are considered to be characteristic of the invention are set forth with particularity in the appended claims. The invention itself, however, in respect of its operating steps and the sequence thereof, and the structure, construction and lay-out as well as manufacturing techniques involved in apparatus for practicing the invention, together with other objects and advantages thereof, will be best understood from the following description of preferred embodiments when read in connection with the appended drawings, in which:

FIG. 1 schematically depicts an embodiment suitable for water-insoluble organic secondary refrigerants including direct cooling, in two refrigerant circuits following compression and cold storage of the refrigerant;

FIG. 2 schematically depicts an embodiment suitable for water-insoluble organic secondary refrigerants including indirect cooling instead of the first refrigerant circuit following compression and cold-storage of the refrigerant; and FIG. 3 schematically depicts an embodiment suitable for water-insoluble secondary refrigerants including direct cooling following compression, and a cascading circuit arrangement (Reihen-Sprung-Schaltung) for internal heat exchange and extraneous coldness connection.

DETAILED DESCRIPTION OF THE PREFERRED EMBODIMENTS

Figure 1:
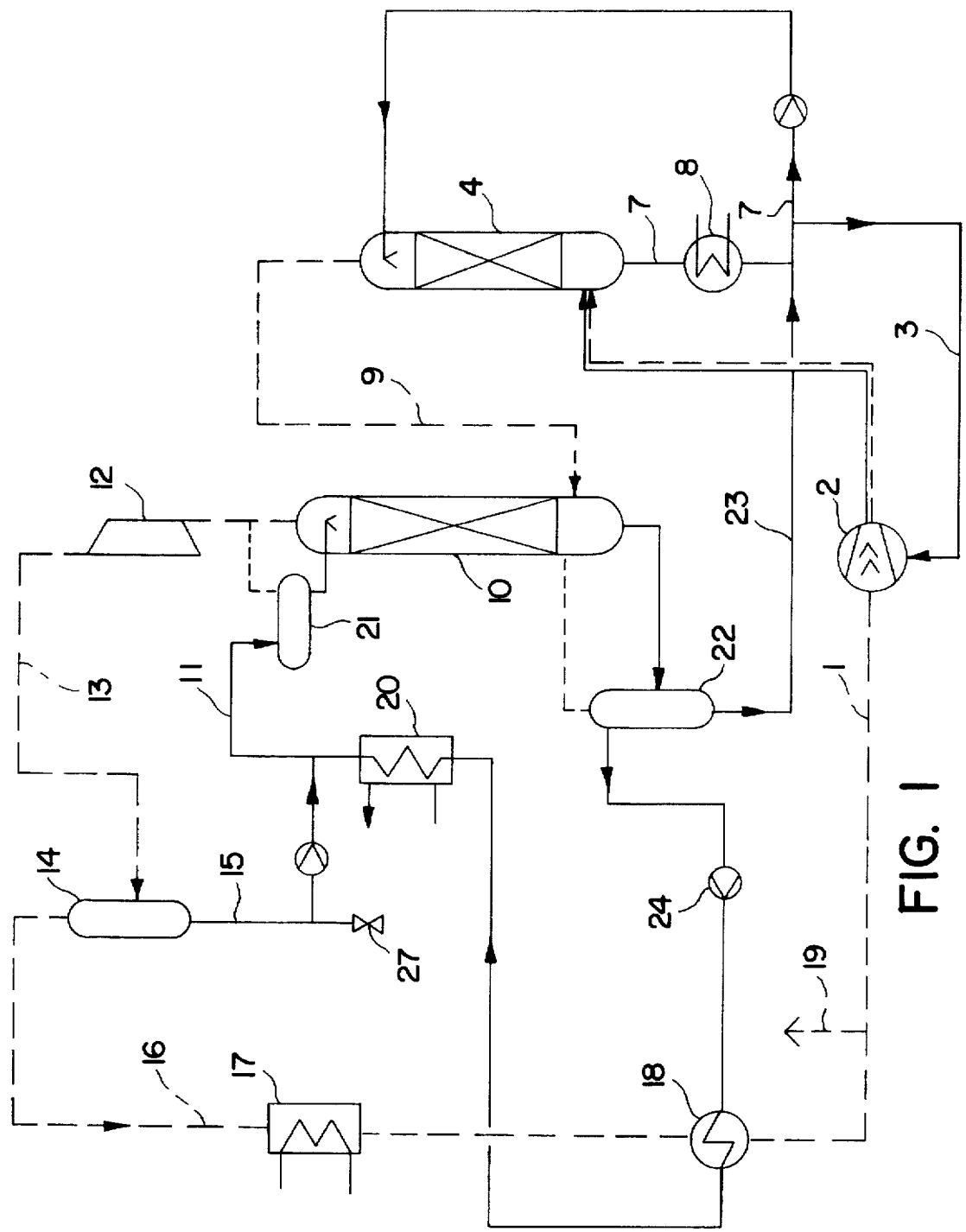
Figure 2:
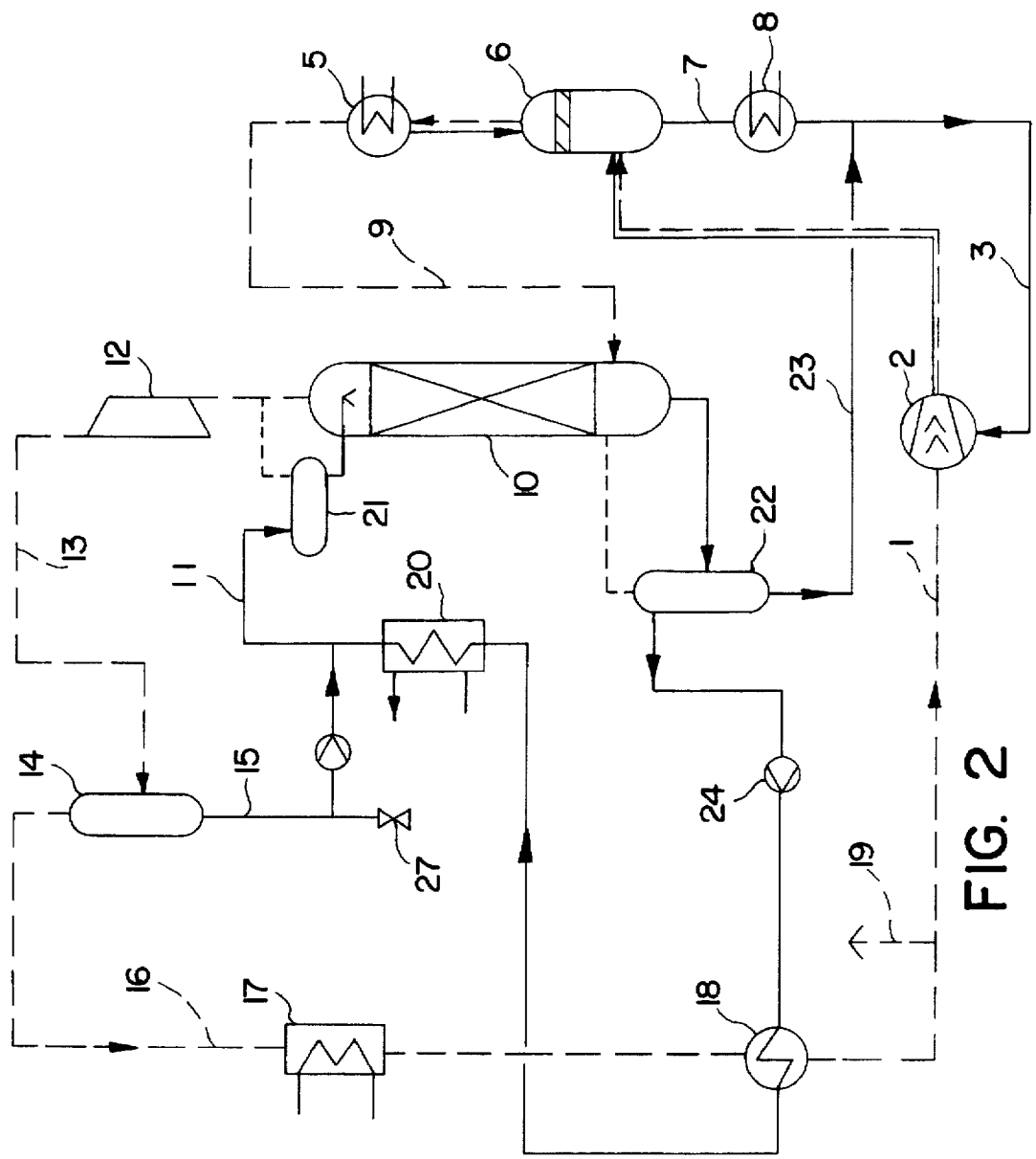

Circulating air 1 is isothermally compressed in a screw-type compressor 2 equipped with water injection and is aftercooled either directly in a scrubber column 4 by water as the first refrigerant (FIG. 1) or in an indirect cooler 5 (FIG. 2). Water 7 is removed from the bottom of the scrubber column 4 or of a separator 6 and cooled by cooling water in a cooler 8. A portion of the water is recirculated as injection water 3 to the compressor 2. In case of direct cooling, a further portion of the water is fed to the scrubber column 4.

Figure 3:
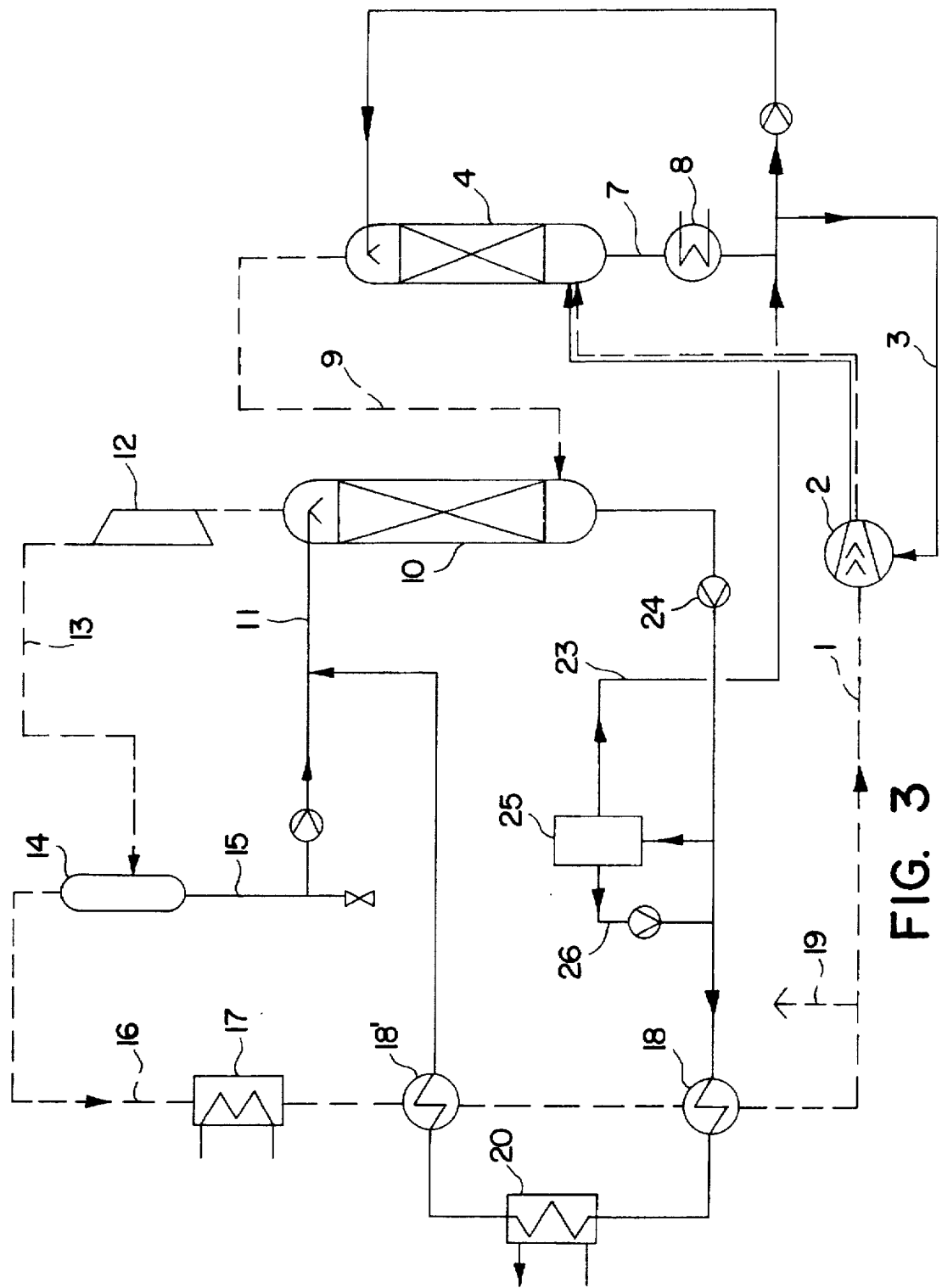

A precooled compressed flow of air 9 is precooled in a cold scrubber 10 in a counter-flow arrangement by a second liquid secondary refrigerant from the circulation system 11 and is then expanded in a turbine 12. If necessary, the expanded air 13 is fed through a cold separator 14 where condensates 15 are separated to be either removed or returned into the refrigerant circuit. Cold air 16 flows to a coldness consumer 17, and any residual coldness of the cold air is transferred in a heat exchanger 18 and, as shown in FIG. 3, a further heat exchanger 18' to the refrigerant within the circulation system 11. Pressure is adjusted to ambient pressure by a breather pipe 19.

Where there is but little residual coldness, the connection of an extraneous source of coldness 20 may be useful for maximum precooling of the second refrigerant and for preventing undesirable condensation or sublimation of cold air 13 downstream of the turbine 12. A cold vapor refrigeration device, for instance, may be utilized as such an extraneous source of coldness. Depending upon the level of temperature of the residual coldness, the extraneous source of coldness 20 may also be connected between the two heat exchangers 18 and 18' (FIG. 3).

For the purpose of easily overcoming, or compensating for, output peaks and for quick start-ups of the system there is provided a refrigerant cold storage 21 connected to the refrigerant circulation system 11 ahead of the cold scrubber 10.

If the second secondary refrigerant in the circulation system 11 is water-insoluble, the separation and diversion of drawn-in humidity from the refrigerant circuit is accomplished by a gravity separator 22. The separated water 23 is fed into the circulating water 7 of the first refrigerant and the water-free refrigerant is fed to a refrigerant pump 24.

If the second secondary refrigerant in the circulation system is water-soluble, a partial flow is diverted. The diverted flow is separated in a separator 25 in water 23 and a flow of refrigerant 26 containing reduced water. The refrigerant flow 26 is fed back into the circulation system 11 of the second refrigerant, while the separated water 23 is fed into the circulating water 7.

Where the infused secondary refrigerant contains excess low boiling point components they may be withdrawn at low temperatures at the discharge 27 to bring about a correction in the boiling point characteristics of the second refrigerant.

What is claimed is:

1. A method of refrigeration, comprising the steps of:
providing air as coolant and as primary refrigerant;
feeding said air to compressor means for substantially isothermal compression;
feeding said compressed air for cooling by direct heat exchange with primary and secondary refrigerants to first and second scrubber column means operated, respectively, by first and second refrigerant circuit means;
feeding said compressed cooled air to turbine means for adiabatic substantially isentropic expansion;
recovering residual coldness from said expanded air by heat exchange means; and
preheating the air fed to said compressor means in said heat exchange means.

2. The method of claim 1, further comprising the steps of operating said first scrubber column means at a first temperature higher than the temperature of said second scrubber column means and utilizing water as the refrigerant in said first refrigerant circuit means.

3. The method of claim 1, further comprising the steps of operating said second scrubber column means at a second temperature lower than the temperature of said first scrubber column means.

4. The method of claim 3, further comprising the step of subjecting the refrigerant in said second refrigerant circuit means to an extraneous source of coldness.

5. The method of claim 4, further comprising the step of selectively supplementing said refrigerant in said second refrigerant circuit means by refrigerant from a cold storage connected to said second refrigerant circuit means.

6. The method of claim 4, further comprising the step of using cold vapor in said extraneous source of coldness.

7. The method of claim 1, further comprising the steps of dividing said second refrigerant circuit means into main and branch circuits and of fractionation by diverting expanded light components from said secondary refrigerant in said branch circuit to affect the boiling point of said refrigerant.

8. The method of claim 7, further comprising the steps of utilizing a water-insoluble refrigerant in said second refrigerant circuit means and of removing water from said water-insoluble refrigerant by a gravity separation means provided in said main circuit.

9. The method of claim 8, further comprising the step of feeding said removed water to said first refrigerant circuit.

10. The method of claim 7, further comprising the steps of utilizing a water-soluble refrigerant in said second refrigerant circuit, of removing water from said water-soluble refrigerant in said branch circuit by separator means provided therein and of feeding said removed water to said first refrigerant circuit means.

11. The method of claim 10, further comprising the steps of feeding said second refrigerant containing reduced water to said second refrigerant circuit means.

12. The method of claim 1, further comprising the steps of operating said compressor means and said turbine means independently.

13. A refrigeration apparatus, comprising: compressor means for providing isothermally compressed air;

first refrigerant circuit means:

first cooling means connected to said compressor means and said first refrigerant circuit means for cooling of said compressed air;

second refrigerant circuit means:

second cooling means connected to said first cooling means and said second refrigerant circuit means for further cooling said compressed air;

turbine means connected to said second cooling means for adiabatically and substantially isentropically providing expanded air from said further cooled compressed air; and heat exchange means associated with at least one of said first and second cooling means for removing residual coldness from said expanded air and connected to said compressor means for feeding preheated air to said compressor means.

14. The apparatus of claim 13, further comprising extraneous coldness source means connected to said first and second refrigerant circuit means.

15. The apparatus of claim 13, further comprising refrigerant cold storage means for selectively supplementing one of said first and second refrigerant circuit means.

16. The apparatus of claim 13, wherein the refrigerant in one of said first and second refrigerant circuit means is water-insoluble and wherein gravity separator means is associated with said one circuit means for removing water from said refrigerant therein.

17. The apparatus of claim 16, wherein said one circuit means comprises main and branch circuit means and wherein said gravity separator is associated with said branch circuit means.

18. The apparatus of claim 17, wherein said compressor means comprises a screw compressor with water injection and wherein said removed water is fed to said compressor.

19. The apparatus of claim 13, wherein said turbine means comprises a high-speed turbine.

20. The apparatus of claim 13, wherein said compressor means and said turbine means are operated independently.

* * * * *